United States Patent [19]

Behrend et al.

[11] 4,450,924
[45] May 29, 1984

[54] ELECTRONIC WEIGHING SCALE

[75] Inventors: Lothar Behrend, Gleichen/Diemarden; Eric Knothe, Bovenden; Franz-Josef Melcher; Jürgen Ober, both of Hardegsen, all of Fed. Rep. of Germany

[73] Assignee: Sartorius GmbH, Fed. Rep. of Germany

[21] Appl. No.: 450,784

[22] Filed: Dec. 17, 1982

[30] Foreign Application Priority Data

Dec. 17, 1981 [DE] Fed. Rep. of Germany ....... 3149989

[51] Int. Cl.³ .......................... G01G 1/38; G01G 3/14; G01R 17/06
[52] U.S. Cl. ............................ 177/212; 177/210 EM; 324/99 D
[58] Field of Search ................... 177/210 EM, 212; 324/99 R, 99 D

[56] References Cited

U.S. PATENT DOCUMENTS

| 3,048,778 | 8/1962 | Rumpel | 324/99 R X |
| 4,099,587 | 7/1978 | Kaufmann | 177/212 X |
| 4,300,647 | 11/1981 | Knothe et al. | 177/212 |

*Primary Examiner*—E. A. Goldberg
*Assistant Examiner*—Patrick W. Foster
*Attorney, Agent, or Firm*—Eric P. Schellin

[57] ABSTRACT

It is known in high-resolution electronic weighing scales based on the principle of electromagnetic force compensation that the load-dependent development of heat in a coil and a precision resistor can be compensated by sending an additional alternating current through the coil and the precision resistor which is complementarily regulated in its amplitude. In order to regulate the amplitude of this alternating current, the invention proposes a simplified circuit which comprises a highly temperature-dependent resistor, the resistance value of which is set at a fixed theoretical value.

6 Claims, 2 Drawing Figures

4,450,924

ELECTRONIC WEIGHING SCALE

BACKGROUND OF THE INVENTION

The invention concerns a scale based on the principle of electromagnetic force compensation with at least one coil which is located in the air gap of a stationary permanent magnet system and is loaded over a position sensor and a gain control amplifier by a direct compensating current dependent on the load of the scale, with a precision resistor through which the same direct compensating current flows and at both ends of which a signal dependent on the load of the scale can be tapped off and fed to an analog to digital converter, with a heating resistor connected in series to the coil and the precision resistor, and with an alternating voltage generator which is regulated in its amplitude by a control circuit and which allows an alternating current to flow through the coil, the precision resistor and the heating resistor in addition to the direct compensating current.

A weighing scale of this type is known from German printed application No. 3,002,462 and also U.S. Pat. No. 4,300,647 of the applicant.

The additional alternating current is designed to provide a load-independent excess temperature in the coil and in the precision resistor. German application No. 3,002,462 and also U.S. Pat. No. 4,300,647 provides either a temperature sensor, e.g., in the form of an NTC (negative temperature coefficient resistor) which determines the temperature of the heating resistor or a radiation sensor which determines the brightness of the heating resistor constructed as an incandescent filament for regulating the amplitude of the alternating voltage generator. It also refers to the possibility of digital control over a microprocessor. All of these embodiments should be improved, as they are relatively complex and require inexpensive construction elements.

The invention therefore has the task of indicating a circuit for the scale designated above which is constructed with simple and inexpensive elements.

SUMMARY OF THE INVENTION

The invention accomplishes this as follows: the heating resistor has a highly temperature-dependent resistance value, and the control circuit regulates the amplitude of the additional alternating current in such a manner that the resistance value of the heating resistor retains a value which is as constant as possible.

The highly temperature-dependent resistance value of the heating resistor is therefore used directly as the input quantity of the control circuit. This resistance value of the heating resistor is determined, for example, in a bridge circuit, whereby this bridge is supplied with voltage either by the direct compensation current or by the additional alternating current.

It is advantageous if the highly temperature-dependent heating resistor is the incandescent filament of an incandescent bulb. In this instance the excess temperature is very high, so that any slight changes in the ambient temperature have practically no effect. It is also possible to use a PTC or an NTC as heating resistor (PTC = Positive Temperature Coefficient).

It is also advantageous to connect the output of the alternating voltage capacitively to the center tapping of the coil, since the inductivity of the two coil halves for the additional alternating current is then cancelled.

The measuring of the resistance value of the heating resistor is advantageously performed in a bridge circuit which is especially simple to construct if the heating resistor is connected in between the coil and the output of the gain control amplifier.

DESCRIPTION OF THE DRAWINGS

The invention is described below with reference made to the drawings.

DETAILED DESCRIPTION OF THE INVENTION

Figure 1:
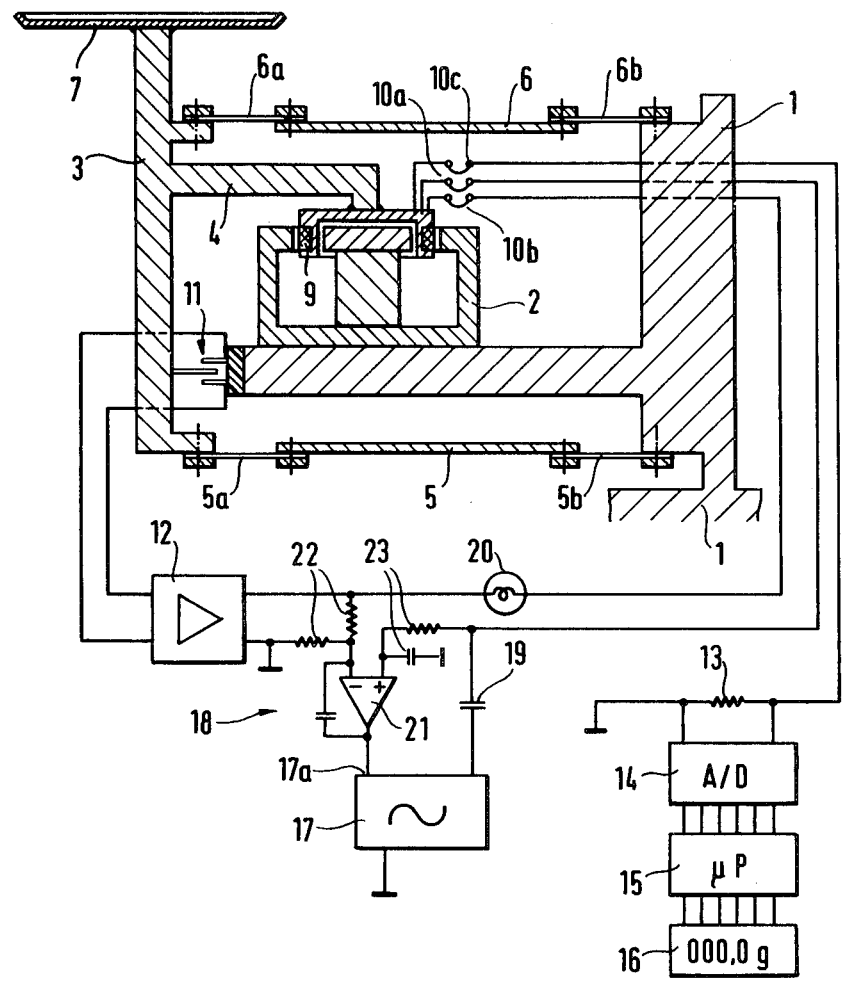
FIG. 1 shows a first embodiment of the electronic weighing scale.

The electronic weighing scale of FIG. 1 consists of a movable load carrier 3 which carries load pan 7. It is connected to the stationary part 1 of the scale over two guide rods 5 and 6 in the form of a parallel guide member. Leaf springs 5a, 5b, 6a, 6b at each end of guide rods 5 and 6 function as articulations. The load carrier 3 carries a coil 9 on a projecting arm 4 which interacts with the field of a stationary permanent magnet system 2. Position sensor 11 senses the position of load carrier 3 and supplies the current necessary to compensate the load over gain control amplifier 12. This direct compensation current is supplied over movable leads 10b and 10c to coil 9 and also flows through heating resistor 20 and precision resistor 13. A current-proportional measuring voltage is tapped off at precision resistor 13, digitalized in analog to digital converter 14, processed in digital calculating circuit 15 and indicated in digital indicator 16.

Alternating voltage generator 17 is provided, which is connected over capacitor 19 to center tapping 10a of coil 9. The additional alternating current fed thereto in this manner divides at that point into two equal partial currents, whereby the one partial current flows over the one coil half and precision resistor 13, while the other partial current flows over the other coil half and heating resistor 20 into the low impedance output of gain control amplifier 12. If the resistance values of heating resistor 20 and of precision resistor 13 are identical, the two partial currents are identical and result, with the direct compensation current which is likewise identical for both resistors, in identical heat loads for both resistors. This is explained in detail in German application No. 3,002,462 cited above.

The amplitude of alternating voltage generator 17 can be regulated by a direct voltage at output 17a. This direct voltage is supplied by control circuit 18. It consists of an integrating amplifier 21 which changes its output voltage in a known manner until the difference voltage between its two inputs is zero. The voltage on the first input of amplifier 21 is taken off a 1:1 voltage divider 22 from the output of gain control amplifier 12 and thus constitutes 50% of the output voltage of gain control amplifier 12. The second input of amplifier 21 is connected to center tapping position 10a of coil 9 over RC member 23, which suppresses the alternating voltage portion. Thus, due to the identicalness of the two coil halves and the identicalness of the resistance values of precision resistor 13 and of heating resistor 20 at the theoretical operating point, 50% of the output voltage of gain control amplifier 12 also appears at the second input of amplifier 21 in the equalized state. Therefore, the amplitude of alternating voltage generator 17 is not shifted in this instance.

According to what was just said, heating resistor 20 is in a bridge circuit, the one bridge branch of which consists of heating resistor 20, the two halves of coil 9 and precision resistor 13, and the other bridge branch of which consists of voltage divider 22. The supply voltage of this bridge is furnished by gain control amplifier 12, while amplifier 21 forms the bridge diagonal and readjusts the amplitude of alternating voltage generator 17 in such a manner when the bridge is detuned, that the theoretical temperature and therewith the theoretical resistance value of heating resistor 20 is regained.

If, for example, the weighing scale suddenly receives a heavier load, so that gain control amplifier 12 supplies a larger direct compensation current, the power loss in heating resistor 20 rises and it raises its resistance value. (In FIG. 1, a heat resistor 20 with positive temperature coefficient has been assumed at the polarity of amplifier 21.). This disturbs the bridge balance; voltage divider 22 supplies a higher voltage than the voltage divider from heating resistors 20, coil 9 and precision resistor 13. The output voltage of integrating amplifier 21 therefore drops, and therewith the amplitude of alternating voltage generator 17 too, until the power loss in heating resistor 20 and therewith its resistance value have regained their original value.

Figure 2:
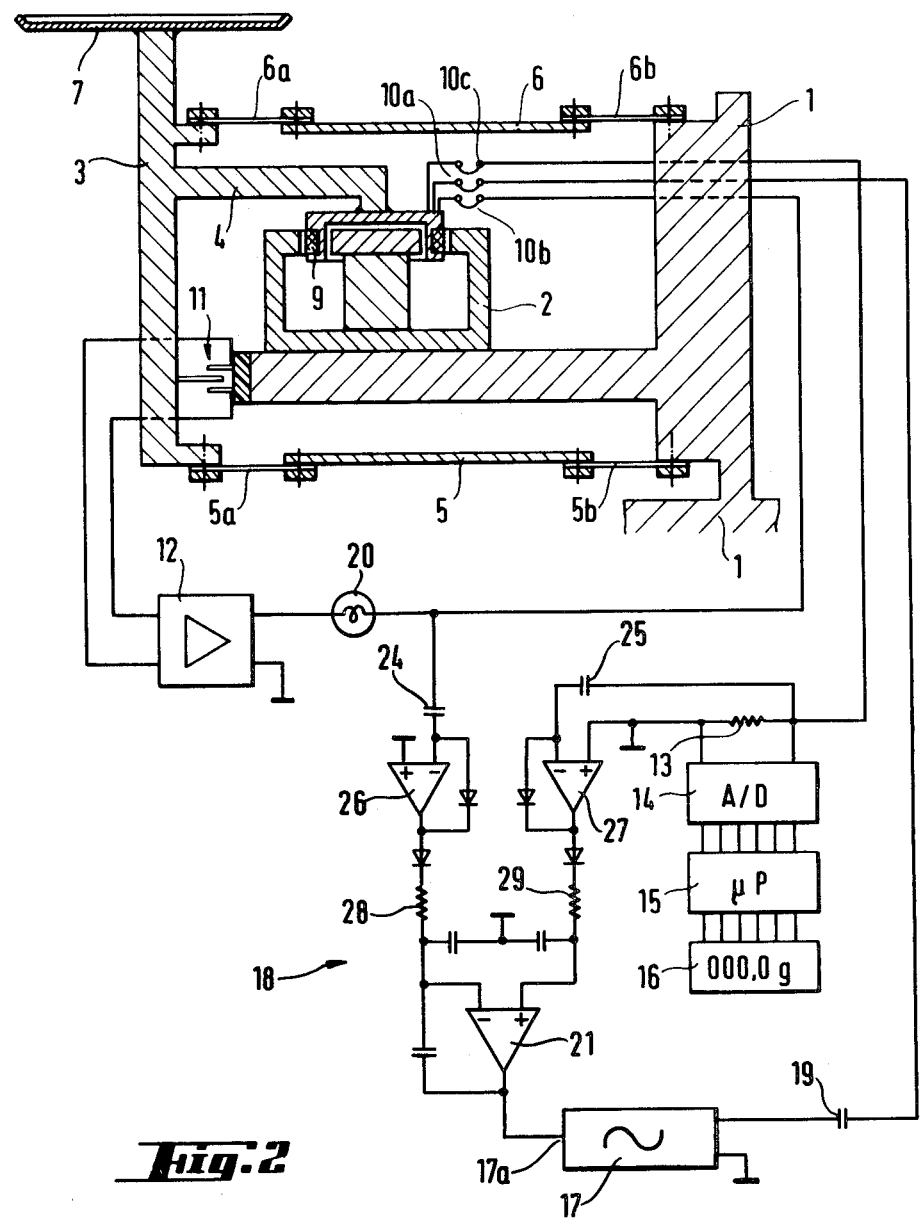
FIG. 2 shows a second embodiment of the electronic weighing scale.

FIG. 2 shows another embodiment of the electric scale. The parts identical to those in FIG. 1 are designated by the same reference numerals. Here, the resistance value of heating resistor 20 is determined in an alternating voltage bridge circuit. Alternating voltage generator 17 furnishes the supply voltage for the bridge. The one bridge branch is formed by the one half of coil 9 between connections 10a and 10b and heating resistor 20 (a low-impedance output of gain control amplifier 12 is again assumed), while the other bridge branch is formed by the other half of coil 9 between connections 10a and 10c and precision resistor 13. The diagonal voltage of the bridge is tuned out capacitively over two capacitors 24 and 25, rectified by two rectifiers 26 and 27, filtered by two RC members 28 and 29 and then fed as difference to integrating amplifier 21.

At the theoretical operating point of the heating resistor, the voltage divider conditions of the two bridge branches are identical, so that the alternating voltages capacitively tuned out at capacitors 24 and 25 are identical and yield the difference voltage zero for amplifier 21 after rectification and filtering. A deviation of the resistance value of heating resistor 20 from the theoretical value is cancelled, as in the circuit of FIG. 1, by a change in the amplitude of alternating voltage generator 17.

The circuit of FIG. 2 with the alternating voltage bridge has the advantage over the circuit of FIG. 1 with the direct voltage bridge in that all circuit elements are coupled capacitively and therefore cannot adulterate the direct compensation current. In contrast thereto, in the circuit of FIG. 1 the input resistance of amplifier 21 constitutes a shunt for a part of coil 9 and precision resistor 13. The input resistance must therefore be appropriately high enough to avoid adversely affecting the preciseness of the scale. Furthermore, the circuit of FIG. 2 has the advantage that given a large amplitude of alternating voltage generator 17, a large measuring sensitivity of the resistance measuring bridge also results, so that large amplitudes can be regulated quite precisely. In contrast thereto, the resistance measuring bridge of FIG. 1 has its greatest sensitivity during large direct compensation currents, that is, during small alternating voltage amplitudes. As the direct compensation current becomes smaller, the sensitivity drops, for which reason the direct compensation current in this circuit must not drop below a certain value and also must not change its polarity. The somewhat more complex construction of the circuit of FIG. 2 can be reduced if the alternating voltages tapped off over capacitors 24 and 25 are fed directly to the inputs of a difference amplifier and the output alternating voltage forms an alternating voltage positive or negative feedback, depending on the polarity, in the alternating voltage generator 17.

It is advantageous in both circuits if heating resistor 20 is formed by the incandescent filament of an incandescent bulb. This incandescent bulb has a large positive temperature coefficient in a state of light red heat, so that great measuring sensitivity results. On account of the high excess temperature, changes in the ambient temperature have only a very slight effect. It is also possible to use other PTC resistors or NTC resistors for the heating resistor. If an NTC resistor is used, the polarity of amplifier 21 in FIGS. 1 and 2 must of course be reversed in order to compensate the opposite polarity of the temperature coefficient.

We claim:

1. In an electronic weighing scale based on the principle of electromagnetic force compensation with:
   (a) at least one coil which is located in the air gap of a stationary permanent magnet system and is loaded over a position sensor and a gain control amplifier by a direct compensating current dependent on the load of the weighing scale,
   (b) a precision resistor through which the same direct compensating current flows and at both ends of which a signal dependent on the load of the weighing scale can be tapped off and fed to an analog to digital converter,
   (c) a heating resistor connected in series to the coil and the precision resistor,
   (d) and an alternating voltage generator which is regulated in its amplitude by a control circuit and which allows an alternating current to flow through the coil, the precision resistor and the heating resistor in addition to the direct compensating current, the improvement comprising:
   the heating resistor having a highly temperature-dependent resistance value, and
   a control circuit (18) regulates the amplitude of the additional alternating current in such a manner that the resistance value of the heating resistor (20) retains a value which is relatively constant.

2. The electronic weighing scale according to claim 1, wherein the heating resistor (20) consists of an incandescent bulb.

3. The electronic weighing scale according to claim 1, wherein the heating resistor is positive temperature coefficient.

4. The electronic weighing scale according to claim 1, wherein the heating resistor (20) is negative temperature coefficient.

5. The electronic weighing scale according to claim 2, wherein the output of the alternating voltage generator (17) is capacitively connected to a center tapping (10a) of the coil (9).

6. The electronic weighing scale according to claim 4, wherein resistor (20) is connected in between the coil (9) and the output of the gain control amplifier (12).

* * * * *